(12) United States Patent
Chandra et al.

(10) Patent No.: US 11,859,298 B2
(45) Date of Patent: Jan. 2, 2024

(54) WASTE POWERED HYDROGEN PRODUCTION SYSTEM AND METHOD

(71) Applicant: Cummins Power Generation Inc., Minneapolis, MN (US)

(72) Inventors: Rishi Chandra, Sugar Land, TX (US); Luke Dewey, Blaine, MN (US); Abdullah Marta, Columbus, IN (US); Jaimie E. Hamilton-Antonson, Minneapolis, MN (US); Dario Patricio Escobar Larenas, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/165,147

(22) Filed: Feb. 6, 2023

(65) Prior Publication Data
US 2023/0250541 A1  Aug. 10, 2023

Related U.S. Application Data

(60) Provisional application No. 63/307,243, filed on Feb. 7, 2022.

(51) Int. Cl.
| | | |
|---|---|---|
| *C25B 9/65* | (2021.01) | |
| *C02F 1/04* | (2023.01) | |
| *C25B 1/04* | (2021.01) | |
| *C25B 15/02* | (2021.01) | |
| *C25B 15/08* | (2006.01) | |

(52) U.S. Cl.
CPC ............... *C25B 9/65* (2021.01); *C02F 1/048* (2013.01); *C25B 1/04* (2013.01); *C25B 15/02* (2013.01); *C25B 15/08* (2013.01)

(58) Field of Classification Search
CPC .............. C25B 1/02; C25B 1/04; C25B 1/042
See application file for complete search history.

(56) References Cited

U.S. PATENT DOCUMENTS

| | | |
|---|---|---|
| 11,002,192 B2 | 5/2021 | Bowen et al. |
| 2008/0102329 A1 | 5/2008 | Hollinger |
| 2012/0024525 A1 | 2/2012 | Svarczkopf et al. |
| 2015/0361833 A1 | 12/2015 | Hinders et al. |

(Continued)

FOREIGN PATENT DOCUMENTS

| | | |
|---|---|---|
| CN | 109338396 | 2/2019 |
| EP | 2 653 773 | 10/2013 |

(Continued)

OTHER PUBLICATIONS

"EIA's Annual Energy Outlook 2019 projects growing oil, natural gas, renewables production," EIA, Jan. 2019, https://www.eia.gov/todayinenergy/detail.php?id=38112.

(Continued)

*Primary Examiner* — Brian W Cohen
(74) *Attorney, Agent, or Firm* — Foley & Lardner LLP (57) ABSTRACT

A waste powered hydrogen production system includes a generator set structured to receive associated gas from an oil extraction system and to produce electrical power by combustion of the gas. The waste powered hydrogen production system further includes an electrolyzer structured to receive wastewater from the oil extraction system, to receive the electrical power produced by the generator set, and produce hydrogen therefrom.

12 Claims, 9 Drawing Sheets

(56) References Cited

U.S. PATENT DOCUMENTS

| | | | |
|---|---|---|---|
| 2017/0051665 A1 | 2/2017 | Hollinger | |
| 2017/0145330 A1 | 5/2017 | Kemmet | |
| 2018/0354712 A1 | 12/2018 | Goleczka et al. | |
| 2019/0063826 A1 | 2/2019 | Prim | |
| 2022/0332598 A1* | 10/2022 | Patton | B01D 1/18 |

FOREIGN PATENT DOCUMENTS

| | | |
|---|---|---|
| GB | 2 515 324 A | 12/2014 |
| KR | 102254409 B1 | 5/2021 |

OTHER PUBLICATIONS

"Flaring Emissions," IEA, Sep. 2022, https://www.iea.org/reports/flaring-emissions.

"Hydrogen," IEA, https://www.iea.org/fuels-and-technologies/hydrogen © 2023, last accessed Feb. 3, 2023.

Carbon Limits AS, "Improving Utilization of Associated Gas in US tight oil fields", Oct. 2015.

DOE, "Clean Hydrogen Production Standard Draft Guidance." Sep. 2022.

DOE-NETL; "Developing Technologies for Upcycling Associated Gas into Higher-Value Products" Dec. 2020.

F. Watson, "COP26: Voluntary carbon market value tops $1 bil in 2021: Ecosystem Marketplace," S&P Global, Nov. 11, 2021.

"Houston as the epicenter of a global clean-hydrogen hub," H2 Houston Hub Initiative, Center for Houston's Future, May 2022.

M. Gordon, "US oil drillers face growing issue of water disposal: fuel for thought," S&P Global, Nov. 13, 2019.

R. Hassler, "Bracing for a Flood, US Shale Set To Treat Less Produced Water Despite Earthquake Boom," Journal of Petroleum Technology. Jan. 6, 2022.

RystadEnergy, Environmental Defense Fund; "Permian Basin Flaring Outlook," Jan. 2021.

International Search Report and Written Opinion on PCT/US2023/012418 dated Aug. 4, 2023.

* cited by examiner

WASTE POWERED HYDROGEN PRODUCTION SYSTEM AND METHOD

CROSS-REFERENCE TO RELATED APPLICATION

The present application claims the benefit of priority to U.S. Application No. 63/307,243 filed Feb. 7, 2022, the entire contents of which are incorporated herein by reference.

TECHNICAL FIELD

The present disclosure relates to the production of hydrogen from a waste energy source. More particularly, the present disclosure relates to systems and methods for producing low carbon hydrogen from associated gas captured during oil extraction.

BACKGROUND

Extraction of petroleum crude oil generally produces gas as a byproduct. Gas associated with the extraction is, for example, natural gas including methane, propane, butane, and/or other gases and compounds. In many installations, capturing and transporting features (e.g., pipelines or other gas transporters) are not available or limited, and the associated gas is sent to a flare stack to be burned (i.e., gas flaring).

Gas flaring is a large source of supply emissions in the oil and gas sector. In 2019, the U.S. alone vented or flared over four-hundred-billion cubic feet of gas per annum. Greenhouse-gas fugitive emissions from gas flaring are a sizeable source of emissions globally, with associated environmental effects.

Additionally, the process of oil extraction produces wastewater that is treated and discarded as a byproduct or waste. For example, it has been estimated that 23 billion barrels of water (wastewater) are produced from oil extraction per year and that approximately 60% of that volume was produced in Texas, New Mexico, and North Dakota (R. Hassler, "Bracing for a Flood, US Shale Set To Treat Less Produced Water Despite Earthquake Boom," *Journal of Petroleum Technology*. Jan. 6, 2022). In some embodiments, the wastewater produced during oil extraction is a cost to oil producers and must be treated before reintroduction into the environment. It has been estimated that in 2020, disposal of wastewater cost about $7.7 billion in the Permian Basin Well of Texas (M. Gordan, "US oil drillers face growing issue of water disposal: Fuel for Thought," *S&P Global*, Nov. 13, 2019).

Recent legislation has addressed emissions reduction, including the Infrastructure Investment and Jobs Act, H. R. 3684, 117th Cong., Nov. 15, 2021, Pub. L. 117-58.

SUMMARY

At least one embodiment relates to a waste powered hydrogen production system that includes a generator set structured to receive associated gas from an oil extraction system and to produce electrical power by combustion of the gas. The waste energy powered hydrogen production system further includes an electrolyzer structured to receive wastewater from the oil extraction system, receive the electrical power produced by the generator set, and produce hydrogen therefrom.

In some embodiments, the generator set is structured to be housed in a first mobile container, and the electrolyzer is structured to be housed in a second mobile container.

In some embodiments, the generator set and the electrolyzer are structured to be housed in a single mobile container.

In some embodiments, the waste powered hydrogen production system further includes a water treatment system structured to treat the wastewater from the oil extraction system. In some embodiments, the water treatment system includes an evaporator and a condenser.

In some embodiments, the electrolyzer includes an electrical module housed in a first mobile container and a processing module housed in a second mobile container.

In some embodiments, the waste powered hydrogen production system further includes a controller and switchgear in communication with both of the generator set and the electrolyzer. In some embodiments, the controller and the switchgear are housed in a single mobile container.

At least one embodiment relates to a waste powered hydrogen production system that includes a water treatment system structured to receive associated gas and wastewater from an oil extraction system, a utility connection structured to receive electrical power from a utility, and an electrolyzer structured to receive treated wastewater from the water treatment system, receive electrical power from the utility connection, and produce hydrogen using the treated wastewater and the electrical power.

In some embodiments, the water treatment system includes an evaporator and a condenser.

In some embodiments, the electrolyzer includes an electrical module housed in a first mobile container and a processing module housed in a second mobile container.

In some embodiments, the waste powered hydrogen production system further includes a controller and switchgear in communication with both of the generator set and the electrolyzer.

In some embodiments, the controller and the switchgear are housed in a single mobile container.

In some embodiments, the utility connection is structured to receive electrical power from one or more renewable energy sources.

In some embodiments, the water treatment system is structured to receive associated gas including flare gas.

At least one embodiment relates to a method of producing hydrogen. The method includes receiving, by at least one of a generator set or a water treatment system, gas associated with an oil extraction system; producing, by at least one of the generator set or a utility connection, electrical power; receiving, by an electrolyzer communicated with the oil extraction system, treated wastewater from the water treatment system and produced electrical power; and electrolyzing, by the electrolyzer, the wastewater to produce hydrogen.

In some embodiments, the method further includes producing, by the generator set, electrical power by combustion of the received associated gas.

In some embodiments, the method further includes treating the wastewater, by the water treatment system including an evaporator for evaporating wastewater using the received associated gas.

In some embodiments, the method further includes controlling, by a controller and switchgear housed in a single mobile container, both of the generator set and the electrolyzer.

In some embodiments, the method further includes producing, by the utility connection, electrical power by renewable energy sources.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

Various details are provided to impart a thorough understanding of embodiments of the subject matter of the present disclosure. The described features of the subject matter of the present disclosure can be combined in any suitable manner in one or more embodiments and/or implementations.

DETAILED DESCRIPTION

Following below are more detailed descriptions of various concepts related to, and implementations of, systems and methods for producing low carbon hydrogen from a waste energy product. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

"Clean hydrogen" is defined in recent legislation as "hydrogen produced with a carbon intensity equal to or less than 2 kilograms of carbon dioxide-equivalent produced at the site of production per kilogram of hydrogen produced." Infrastructure Investment and Jobs Act, H. R. 3684, 117th Cong., Nov. 15, 2021, Pub. L. 117-58, 135 Stat. 1015. As utilized herein, the terms "low carbon hydrogen" or "clean hydrogen" refer to hydrogen produced with a carbon intensity equal to or less than about two kilograms of carbon dioxide equivalent produced at the site of production per kilogram of hydrogen produced. Further, the expression "hydrogen," whether or not accompanied by a modifier, e.g., "low carbon" or "clean," includes forms of hydrogen such as dihydrogen ($H_2$).

Referring to the figures generally, the various embodiments disclosed herein relate to systems, apparatuses, and methods for producing low carbon hydrogen using waste energy and/or wastewater. In some embodiments, the waste energy is supplied by associated gas that is produced as a byproduct of oil extraction. A waste energy powered hydrogen production system includes a generator set for producing electrical energy from the waste energy source (e.g., associated gas, flare gas, etc.) and an electrolyzer. The electrolyzer is configured to be powered by the generator set and configured to receive oil extraction wastewater for the production of hydrogen.

In some embodiments, the electrolyzer is configured to be powered by a utility, a renewable energy, or another source of energy. In some embodiments, the electrolyzer is configured to receive fresh water for the production of hydrogen. In some embodiments, the hydrogen production system produces low carbon hydrogen by burning a waste fuel source (e.g., associated gas) and utilizing a wastewater source (e.g., wastewater from oil extraction). In some embodiments, the hydrogen production system produces low carbon hydrogen by utilizing a utility and/or renewable energy source and a wastewater source (e.g., wastewater from oil extraction). In some embodiments, the hydrogen production system produces low carbon hydrogen by burning a waste fuel source (e.g., associated gas) and utilizing a fresh water source. In some embodiments, the hydrogen production system reduces the amount of associated gas that is flared.

Figure 1:
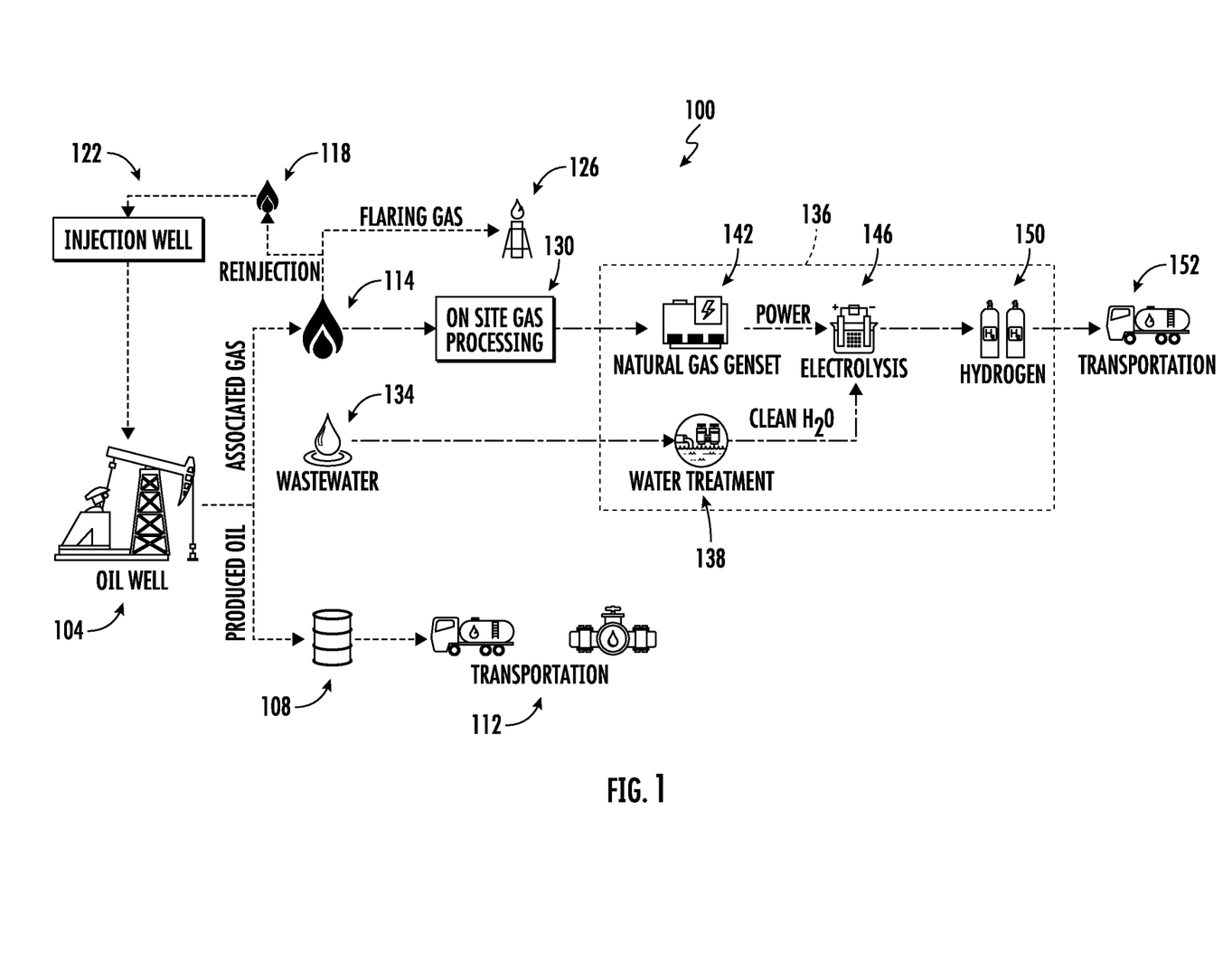
FIG. 1 is a schematic diagram of an oil extraction system including a waste energy powered hydrogen production system, according to some embodiments.

As shown in FIG. 1, an oil extraction system 100 includes an oil well and extraction apparatus (e.g., an oil extractor) 104 that is arranged to produce a flow of oil 108 for packaging and transport 112. In some embodiments, the oil well and extraction apparatus 104 includes hydraulic fracturing equipment used in an extraction process called fracking. The production of the flow of oil 108 results in a corresponding flow of associated gas 114.

Associated gas is generally considered a waste product in some installations. For example, in some locations, no pipeline or other transportation architecture exists to transport associated gas to a refinery for processing into usable fuel (e.g., natural gas that is sufficiently refined so as to be suitable for delivery for end applications such as heating systems for buildings). In some embodiments, the associated gas is a natural gas including methane, propane, butane and/or other gases and compounds. The associated gas is susceptible to including entrained water or other contaminants that are not conducive to combustion. The Energy Information Association's 2019 Report on Energy Production reported that 500 billion cubic feet of associated gas was produced in the U.S. and that approximately 60% of that volume was produced in Texas, New Mexico, and North Dakota.

In some embodiments, an injection well 122 is configured to cause a reinjection portion 118 of the associated gas 114 to be reinjected into the oil well and extraction apparatus 104. The oil extraction system 100 is configured to send excess associated gas 114 to a flare apparatus 126 for combustion (e.g., flaring). The oil extraction system 100 is configured to reduce the incidence of gas flaring.

In some embodiments, an onsite gas processing unit (processor) 130 is arranged to receive the associated gas 114. The onsite gas processing unit 130 is collocated with the oil well and extraction apparatus 104 such that gas processing does not require a pipeline or transportation to an offsite processing plant. In some embodiments, the onsite gas processing unit 130 is configured for large particle impurity removal via filtering, scrubbing, heating, cooling, etc. The onsite gas processing unit 130 is configured to include one or more oil separators (e.g., mechanical, thermodynamic, etc.) in some embodiments.

In some embodiments, the onsite gas processing unit 130 includes a gas sweetening system (gas sweetener) to remove compounds. The compounds may include but are not limited to hydrogen sulfide and carbon dioxide. In some embodiments, the onsite gas processing unit 130 includes a dehydration system configured to remove excess water from the gas. In some embodiments, the onsite gas processing unit 130 includes a mercury removal system. In some embodiments, the onsite gas processing unit 130 includes a nitrogen rejection system to remove nitrogen. In some embodiments, the onsite gas processing unit 130 includes a natural gas liquid recovery system. In some embodiments, the onsite gas processing unit 130 includes a fractionalization system (e.g., a continuous spin fractionation apparatus) to isolate particular compounds for use downstream of the onsite gas processing unit 130.

In some embodiments, the onsite gas processing unit 130 includes each of, or any combination of, the foregoing subsystems (namely, one or more oil separators, the gas sweetening system, the dehydration system, the mercury removal system, the nitrogen rejection system, the natural gas liquid recovery system or the fractionalization system). For example, the onsite gas processing unit 130 in some embodiments may lack a mercury removal system, a natural gas liquid recovery system, or a fractionalization system. In some embodiments, the onsite gas processing unit 130 is configured to communicate with a plurality of sensors respectively configured to sense an amount of one or more elements or compounds variously associated with one or more of the oil separators, the gas sweetening system, the dehydration system, the mercury removal system, the nitrogen rejection system, the natural gas liquid recovery system or the fractionalization system. For example, in some embodiments, the onsite gas processing unit 130 is configured to communicate with a nitrogen sensor which is communicated with or part of the nitrogen rejection system and/or a mercury sensor communicated with or part of the mercury removal system.

The onsite gas processing unit 130 is configured to receive associated gas and provide a combustible fuel product. The combustible fuel product provided by the onsite gas processing unit 130 is a waste product in the oil extraction process. The process of oil extraction also produces wastewater 134.

The wastewater 134 presents a significant cost. Converting the wastewater 134 to hydrogen presents a solution for oil producers that recoups value from the wastewater while reducing the volume of wastewater the oil producer must pay to treat. Therefore, the usage of wastewater 134 for the production of hydrogen can be advantageous in combination with associated gas usage, or independently of associated gas usage. In some embodiments, the waste powered hydrogen production system 136 includes a water treatment system 138 structured to treat the wastewater from the oil extraction system 100.

A waste powered hydrogen production system 136 includes a generator set 142 structured to receive associated gas 114 from the oil extraction system 100 and to produce electrical power by combustion of the gas 114, and an electrolyzer 146 structured to receive wastewater 134 from the oil extraction system 100, receive the electrical power produced by the generator set 142, and to produce hydrogen therefrom.

A waste energy powered hydrogen production system 136 is positioned onsite with the oil well and extraction apparatus 104. The waste energy powered hydrogen production system 136 is configured to use the waste products of the oil extraction process (e.g., the associated gas 114 and the wastewater 134). In particular, the waste products are used to produce low carbon hydrogen for storage and transport offsite. The hydrogen production system 136 includes a water treatment system 138. The water treatment system 138 is structured to treat the wastewater 134 from the oil well and extraction apparatus 104. The waste energy powered hydrogen production system 136 is further configured to include a generator set (also called a "genset") 142 that is configured to be powered by the combustible fuel product produced by the onsite gas processing unit 130. The generator set 142 is configured to generate electrical power. In some embodiments, the generator set 142 is structured to be housed in a first mobile container.

The waste energy powered hydrogen production system 136 further includes an electrolysis unit (an electrolyzer) 146 that is powered by the electrical power produced by the generator set 142. The electrolysis unit 146 is configured to process the treated wastewater to produce hydrogen 150. In some embodiments, the electrolyzer 146 is structured to be housed in a second mobile container. Hydrogen produced by the electrolysis unit 146 is storable onsite until ready for transportation 152 and distribution.

Existing solutions to reduce or eliminate flare gas attempt to capture and export natural gas (NG), natural gas liquids (NGL), or electricity. For various reasons, significant infrastructure investment in existing solutions, especially for remote and dispersed sites, is lacking. Hence, flaring continues to be significant. The present disclosure describes techniques to reduce flaring. For example, the waste energy powered hydrogen production system 136 provides a solution that can produce a commodity (e.g., low carbon hydrogen) onsite (e.g., collocated with the oil well and extraction apparatus 104). In some embodiments, the components of the waste energy powered hydrogen production system 136 can be containerized.

Figure 2:
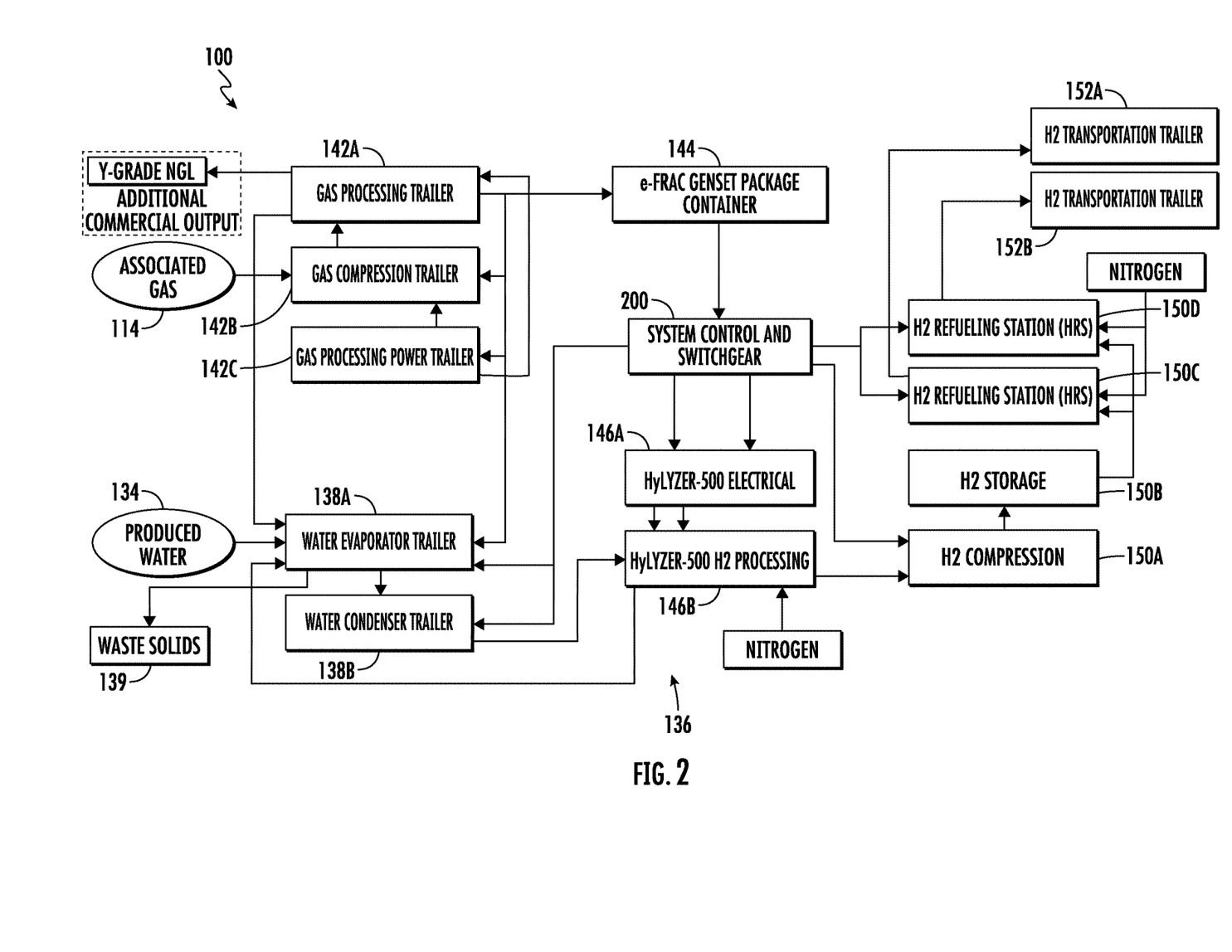
FIG. 2 is a schematic diagram of the hydrogen production system of FIG. 1, according to some embodiments.

In some embodiments, the waste energy powered hydrogen production system 136 includes one or more housings or containers. For example, the wastewater treatment system 138 is configured to be housed in a first container. The generator set 142 is configured to be housed in a second container. The electrolysis unit 146 is configured to be housed in a third container. In some embodiments, each housing is an ISO standard container (12.192 m) or a high cube storage container (16.15 m in length). In some embodiments, the waste energy powered hydrogen production system 136 includes a single housing or container. In some embodiments, the generator set 142 and the electrolyzer 146 are structured to be housed in a single mobile container. In some embodiments, water evaporator trailer 138A, water condenser trailer 138B, and water transportation trailers 152A, 152B are all 16.5 m-long shipping containers whereas each of the electrolyzer modules 146A, 146B, water storage, compression, and refueling components 150A-150D, as well as the system control and switchgear 200, are stored in ISO containers of 12.192 m in length.

In some embodiments where the waste energy powered hydrogen production system 136 is provided with a single housing or container, one or more of the wastewater treatment system 138, the generator set 142, and the electrolysis unit 146 are housing in the same housing or container. In some embodiments, each of the wastewater treatment system 138, the generator set 142 and the electrolysis unit 146 is housed in a common housing or container. In some embodiments, two or more components of the waste energy powered hydrogen production system 136 are housed in a common housing or container. In some embodiments, the generator set 142 and the electrolysis unit 146 are provided in a first common housing or container, and the wastewater treatment system 138 is provided in a second housing or container. In some embodiments, one or more, or any of the housings or containers, is configured to be mobile. Thus, in some embodiments, a housing of the generator set 142 is a mobile container. In some embodiments, a housing of the generator set 142 is a mobile container and a housing of the electrolysis unit 146 is a mobile container. In some embodiments, the generator set 142 is a mobile container, and the generator set 142 and electrolysis unit 146 are housed in a common mobile container.

Packaging of the waste energy powered hydrogen production system 136 in ISO containers drastically reduces shipping and transportation costs associated with delivering the waste energy powered hydrogen production system 136 to the site of the oil well and extraction apparatus 104. In some embodiments, the generator set 142 and the electrolysis unit 146 are housed in mobile containers (e.g., including wheels or other tractive elements to allow overland hauling by a vehicle such as a semi-tractor). Additionally, the containerized components are configured to provide self-contained housings protecting machinery and control equipment for environmental elements (e.g., rain, wind, ice, extreme temperatures, etc.).

As shown in FIG. 2, an exemplary implementation of the oil extraction system 100 includes three generator sets 142A-C. In some embodiments, the second generator set 142B received the associated gas 114. In some embodiments, the first generator set 142A receives an additional commercial output such as y-grade or raw make natural gas liquids (NGL). In some embodiments, the water treatment system includes an evaporator (e.g., a water evaporator 138A) and a condenser (e.g., a water condenser 138B). In some embodiments, the water evaporator 138A utilizes waste heat from a combined heat and power (CHP) system to increase efficiency of the water evaporator 138A. The generator sets 142A-C provide electrical power to an electronic fracking or e-Frac generator set package 144 that provides power to a fracking system (e.g., pressure pumps, etc.). Drained waste solids 139 (e.g., a concentrate, brine, etc.) are removed form the water evaporator 138A. The waste solids 139 can be mixed with the balance of produced water 134 that is not used for hydrogen production and disposed though existing water management systems at the oil and gas production site, or sold for fracking operations where this waste solid 139 (e.g., concentrated salt) is currently used and has market value.

In some embodiments, the waste powered hydrogen production system 136 further includes a controller or control system 200 and switchgear in communication with both of the generator set 142 and the electrolyzer 146. In some embodiments, the controller 200 and the switchgear are housed in a single mobile container. In some embodiments, the control system 200 including switchgear receives and distributes electrical power to the oil extraction system 100. In some embodiments, the electrolyzer 146 includes an electrical module 146A housed in a first mobile container and a processing module 146B housed in a second mobile container. The electrical module 146A receives and controls electrical power and the processing module 146B is powered by the electrical module 146A and processes water received from the water condenser 138B. The processing module 146B produces hydrogen and provides it to a hydrogen compressor 150A.

In some embodiments, the processing module 146B also consumes nitrogen from a nitrogen supply. The compressed hydrogen is provided to a storage unit 150B before refueling stations 150C, 150D fill transports 152A, 152B. In some embodiments, the refueling stations 150C, 150D also consume nitrogen from a nitrogen supply. In some embodiments, more or less generator sets 142A-C are included in the oil extraction system 100 based on the power required by the system. As discussed above, the oil extraction system 100 can include onsite gas processing 130 and/or physical water filtration. Further, in some embodiments, the oil extraction system 100 can include other systems for processing the waste materials (e.g., the associated gas 114, the wastewater 134, etc.). In some embodiments, the module or units of the oil extraction system 100 are containerized (i.e., provided in ISO containers, trailers) or otherwise mobile so that they can be readily arranged and installed on site.

Figure 3:
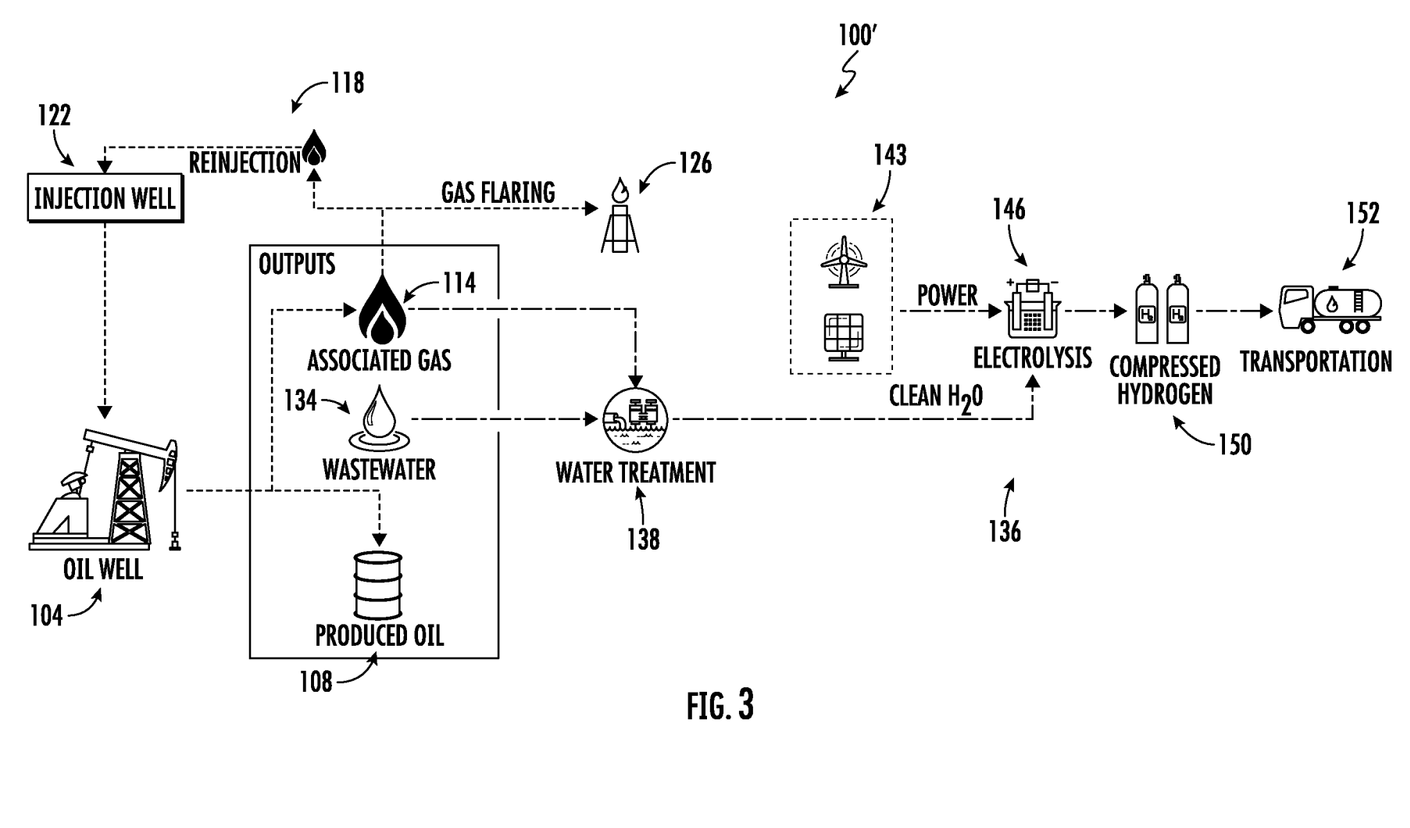
FIG. 3 is a schematic diagram of a hydrogen production system that utilizes a utility connection and renewable electricity, according to some embodiments.
Figure 4:
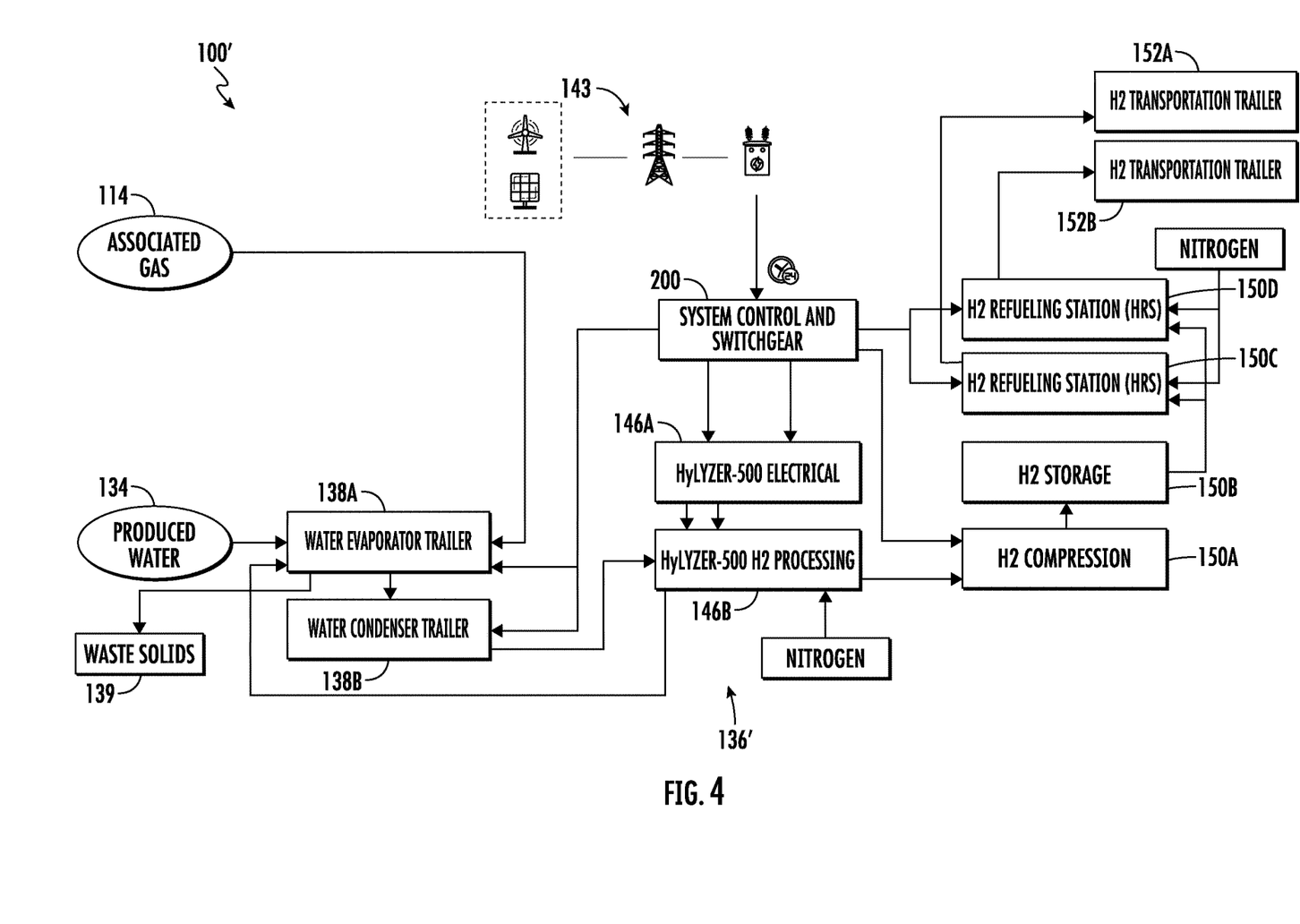
FIG. 4 is a schematic diagram of the hydrogen production system of FIG. 3, according to some embodiments.

As shown in FIGS. 3 and 4, an oil extraction system 100' is similar to the oil extraction system 100 discussed above, and includes a utility connection 143. In some embodiments, the utility connection 143 includes at least one switchgear connected to one or more of a utility grid, a hydroelectric dam, a wind generator, a solar array, a battery bank, and/or another renewable energy source. In some embodiments, one or more of the generator sets 142A-C discussed above can be eliminated when the utility connection 143 is available. In some embodiments, the oil extraction system 100 or 100' includes both the generator set(s) 142 and the utility connection 143. The oil extraction system 100' can advantageously provide a way to reduce wastewater 134 waste or disposal costs while producing hydrogen when suitable associated gas 114 is not available to power generator sets 142. In this way, the oil extraction system 100, the oil extraction system 100', or any combinations of the features described herein can be used to produce clean hydrogen in a wide variety of situations.

In some embodiments, the waste powered hydrogen production system 136' includes the water treatment system 138A,B structured to receive associated gas 114 and wastewater 134 from the oil extraction system 100'. The waste powered hydrogen production system 136' includes the utility connection 143 structured to receive electrical power from a utility, and the electrolyzer 146A, 146B structured to receive treated wastewater from the water treatment system 138A, 138B. The electrolyzer 146A, 146B is further structured to receive electrical power from the utility connection 143, and produce hydrogen using the treated wastewater and the electrical power.

Figure 5:
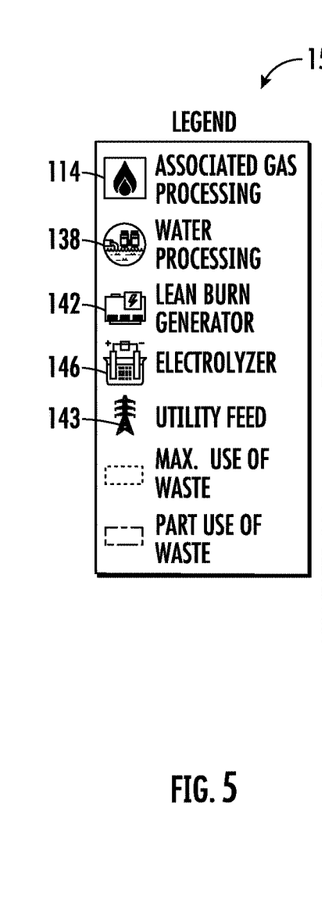
FIG. 5 is a schematic diagram of a legend for system arrangements for a hydrogen production system based on the availability of produced water and associated gas, according to some embodiments.
Figure 6:
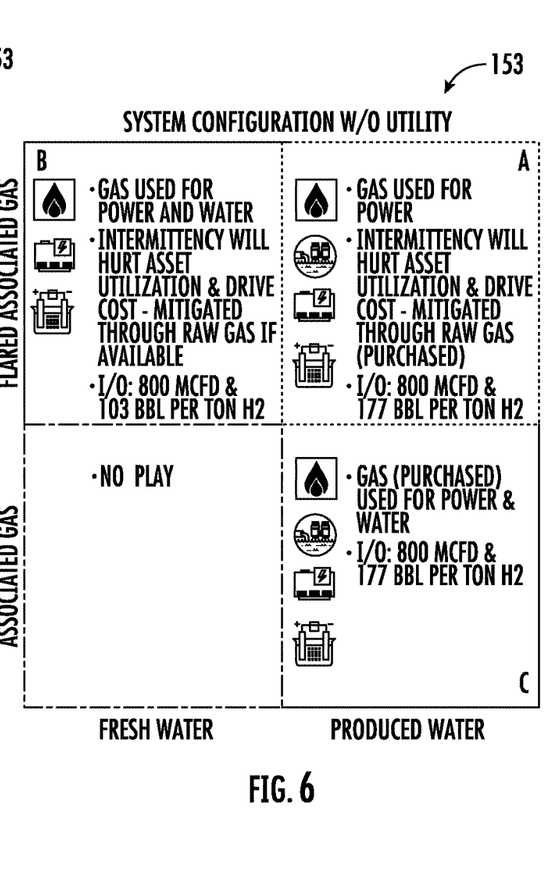
FIG. 6 is a schematic diagram of a first system arrangement for a hydrogen production system based on the availability of produced water and associated gas, according to some embodiments.
Figure 7:
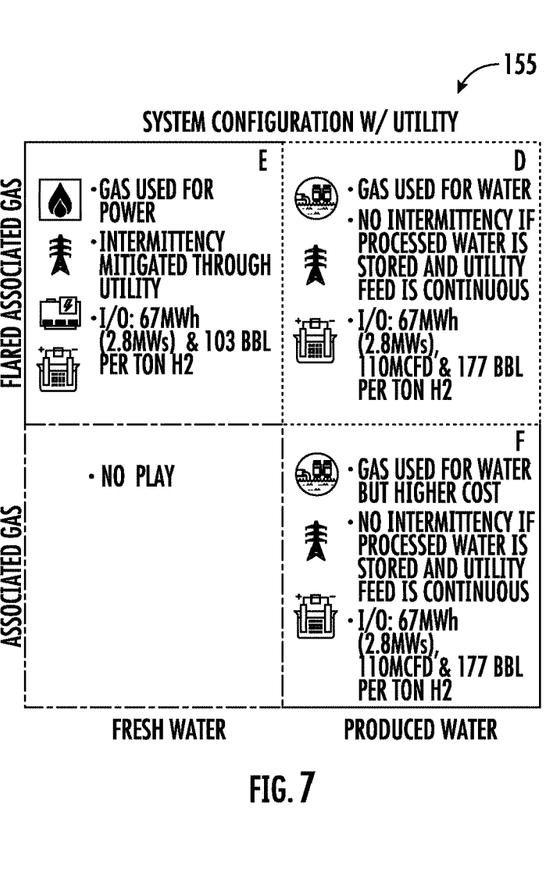
FIG. 7 is a schematic diagram of a second system arrangement for a hydrogen production system based on the availability of produced water and associated gas, according to some embodiments.

As shown in FIG. 5, legend 153 shows factors that can affect how an oil extraction system (e.g., 100, 100', etc.) is configured. For example, the availability of associated gas 114 and the quality of the associated gas, the water processing 138, the generator set 142, the electrolyzer 146, and the utility feed 143 can influence oil extraction system 100, 100'. FIGS. 6 and 7 each depict exemplary configuration aspects where, in each of FIG. 6 and FIG. 7, a bottom-left quadrant thereof describes factors relating to fresh water and associated gas, an upper-left quadrant describes factors relating to fresh water and flared associated gas, a bottom-right quadrant describes factors relating to produced water and associated gas, and an upper-right quadrant describes factors relating to produced water and flared associated gas. In both FIGS. 6 and 7, there may be little or no shale play (composed of known or unknown gas and oil reserves) available.

As shown in FIG. 6, in a first configuration 154, the oil extraction system 100 is implemented when the associated gas 114 is of suitable quality and/or no utility connection 143 is available. In some embodiments, the oil extraction system 100 is arranged in the first configuration 154 (see the upper right quadrant A of FIG. 6) when flared associated gas and either produced water or waste water 134 is available. In configuration A, both waste products (e.g., associated gas and wastewater) are used to produce clean hydrogen and reduce the amount of associated gas that is flared and the amount of wastewater than is treated or discarded. Intermittency adversely affects asset utilization and can increase costs, which can be mitigated through the use of raw gas (whether purchased or otherwise available). Alternative situations (shown in the upper left quadrant B and lower right quadrant C of FIG. 6) can be suitable for implementation of the oil extraction system 100. For example, the configuration in the upper left quadrant B may be used to reduce the amount of associated gas 114 that is flared, without reducing wastewater 134. Alternatively, the lower right quadrant C can allow for wastewater 134 to be processed, but no flaring is reduced. In quadrants A and C, the inputs/outputs include 800 MCFD and 170 BBL per ton of $H_2$, whereas in quadrant B, the inputs/outputs include 800 MCFD and 103 BBL per ton of $H_2$. In quadrant A, gas is used for power, whereas in quadrants B and C, gas is used for both water and power (where in quadrant C, the gas is purchased gas).

As shown in FIG. 7, in a second configuration 155, the oil extraction system 100' is implemented when the utility connection 143 is available. In some embodiments, the oil extraction system 100' is arranged in the second configuration 155 (see the upper right quadrant D of FIG. 7) when flared associated gas 114, the utility connection 143, and produced or waste water 134 are available. The inputs/outputs include 67 MWh (2.8 MWs), 110MCFD and 117BBL per ton of $H_2$. In the upper right quadrant D configuration, both waste products (e.g., associated gas and wastewater) are used to produce clean hydrogen and reduce the amount of associated gas that is flared and the amount of wastewater than is treated or discarded. Alternative situations in the upper left quadrant E and lower right quadrant F can be suitable for implementation of the oil extraction system 100'. For example, the configuration shown in the upper left quadrant E, with inputs/outputs of 67 MWh (2.8 MWs) and 103 BBL per ton of $H_2$) may be used to reduce the amount of associated gas 114 that is flared, but does not reduce wastewater 134, and the intermittency may be mitigated through use of the utility. Alternatively, the lower right quadrant F (with the same inputs/outputs as for quadrant D) provides a configuration where wastewater 134 can be processed, but no flaring is reduced, and there can be a higher cost as compared to quadrant D. For quadrants D and F, gas is used for water, whereas in quadrant E, gas is used for power. For the situations shown in quadrants D and F, intermittency may not occur if the processed water is stored and the utility feed is continuous.

Figure 8:
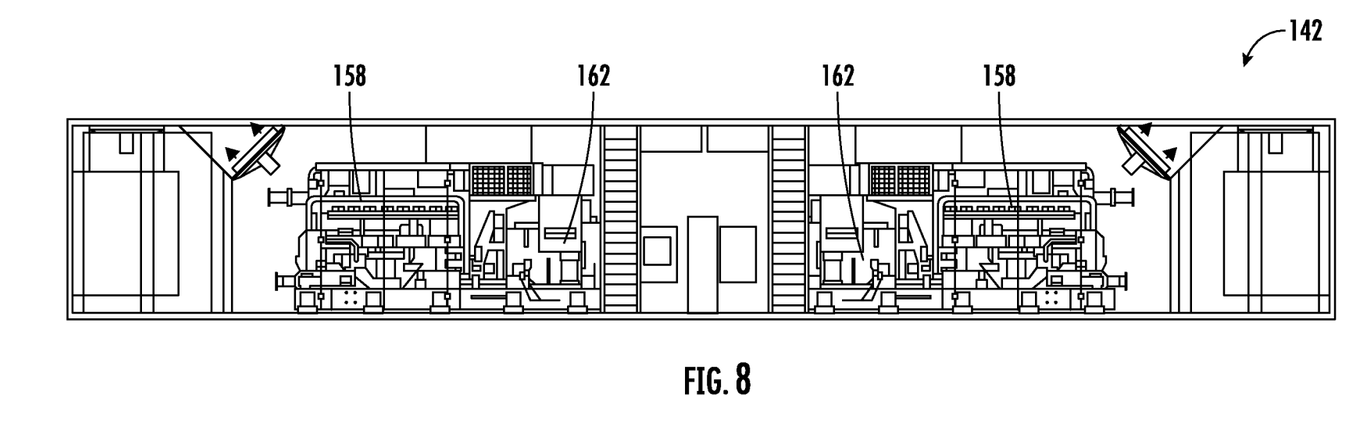
FIG. 8 is a front view of a generator set of the hydrogen production system of FIG. 1, according to some embodiments.
Figure 9:
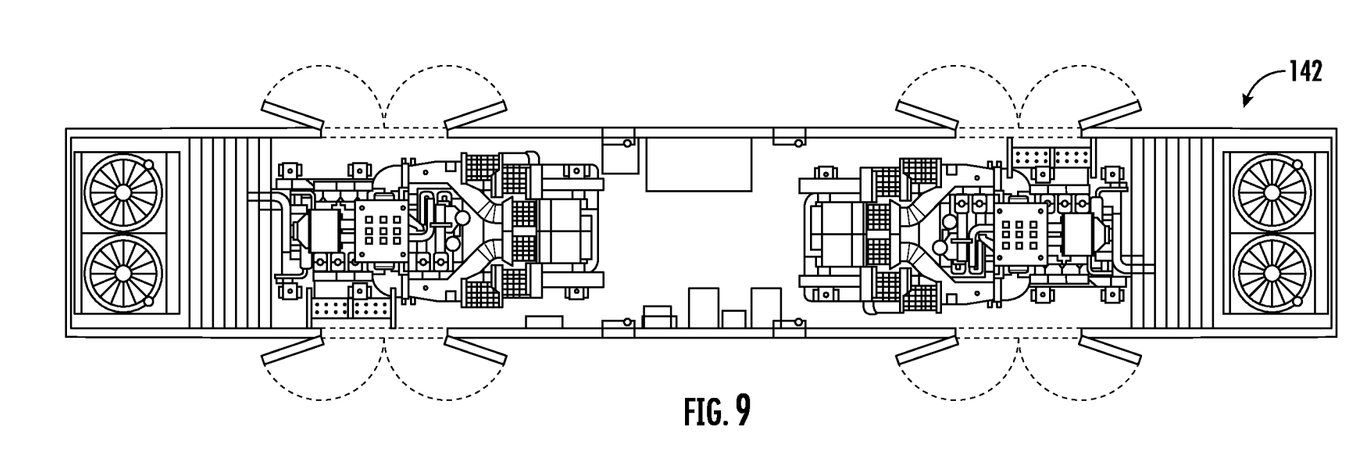
FIG. 9 is a top view of the generator set of FIG. 8, according to some embodiments.

As shown in FIGS. 8 and 9, the generator set 142 is structured to receive associated gas from the oil well and extraction apparatus 104 and to produce electrical power by combustion of the associated gas 114. In some embodiments, the generator set 142 includes two prime movers 158 for burning fuel provided by the onsite gas processing unit 130. The prime movers 158 are configured to produce mechanical energy. Each prime mover 158 is mechanically coupled to an alternator 162 to transform the mechanical energy into electrical power. In some embodiments, the generator set 142 include two QSK60 gas gensets made by Cummins, Inc. of Columbus, Ind. In some embodiments, the generator set 142 includes a housing defining a given length, width and height. For example, in some embodiments, the generator set 142 has a length of about 18.288 m, a width of about 2.59 m, and a height of about 2.896 m. In some embodiments, the housing may be compatible with ISO shipping containers. In some embodiments, any or all of the length, width and height differs in dimensions from those noted above. In some embodiments, the generator set 142 is configured to provide an electrical power output of about 2800 kW.

In some embodiments, the generator set 142 includes cold weather proofing. The generator set 142 is configured to operate in an ambient temperature of negative forty degrees Celsius (−40° C.). In some embodiments, the generator set 142 includes a natural gas heater with individual heat exchange circuits for engine coolant and engine oil. The cold weather arrangement is configured to reduce parasitic energy losses, and improve setup time when the waste energy powered hydrogen production system 136 is installed in cold weather locations.

In some embodiments, the generator set 142 includes one or more variable frequency drive (VFD) controlled fans. The fans are configured to maintain optimal temperatures within the generator set housing. In some embodiment, three-piece radiators are utilized with the VFD fans to provide relatively low power consumption. The radiators may be configured in a cube structure conducive to fracking applications.

In some embodiments, the generator set 142 includes cam-lock style electrical connections, and an isolation switch for medium voltage (MV) and/or high voltage (HV) configurations. In some embodiments, the isolation switch is configured to accommodate voltages in a range of from about 4160V to about 13, 800V for example.

Figure 10:
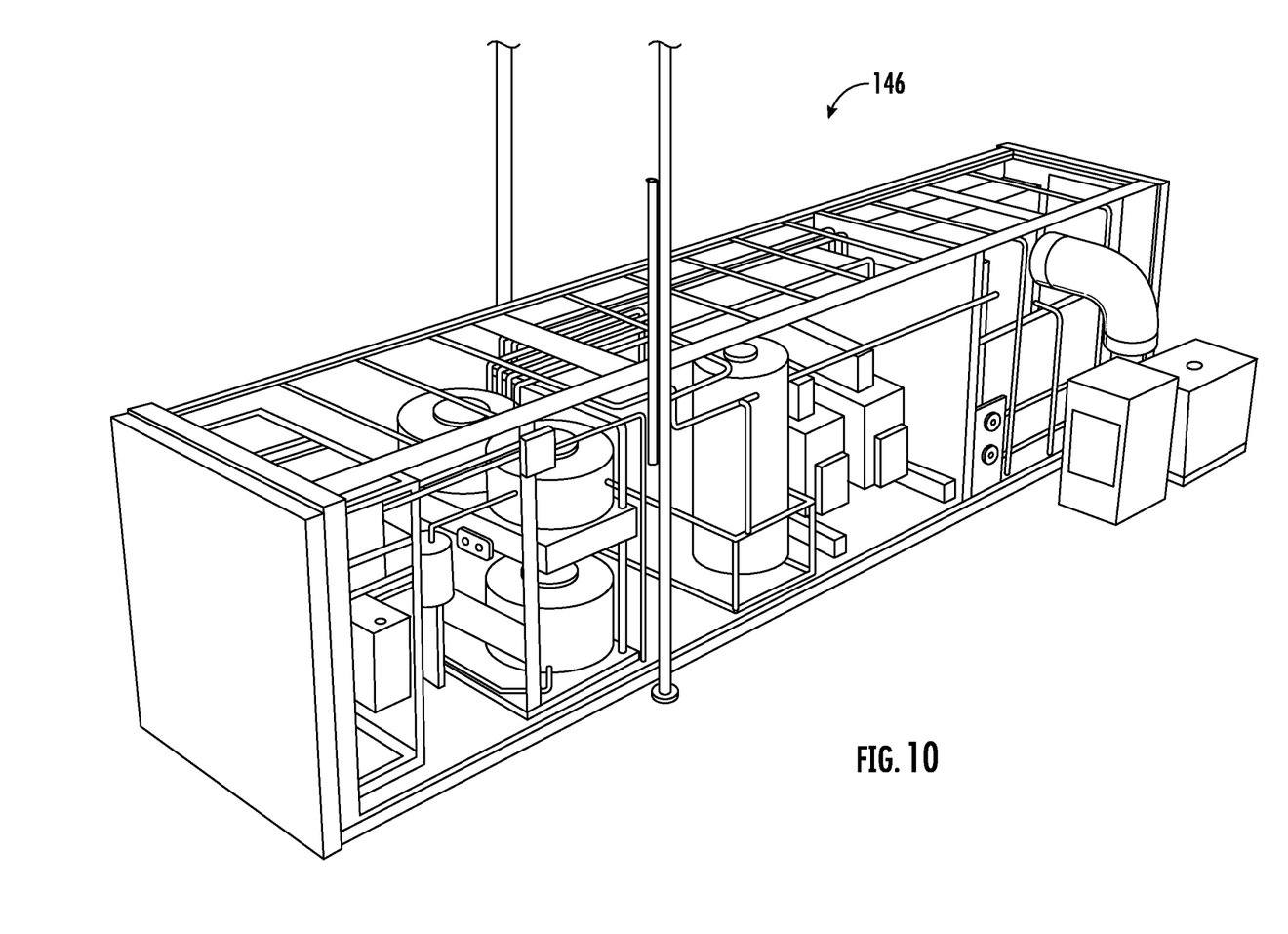
FIG. 10 is a perspective view of a hydrolysis unit of the hydrogen production system of FIG. 1, according to some embodiments.

As shown in FIG. 10, the electrolysis unit 146 (which can be a HyLYZER® made by Cummins Inc. of Columbus, Ind., e.g., a HyLYZER® 500 electrolyzer) is structured to receive wastewater 134 from the oil well and extraction apparatus 104. The electrolysis unit 146 is powered by the electrical power produced by the generator set 142. The electrolysis unit 146 is configured to produce hydrogen for storage 150 and transportation 152. The electrolysis unit 146 provides for stack balancing with circuitry. The circuitry includes a transformer, a rectifier, and a de-ionized water circuit, for example. Additionally, associated controls and software are provided to carry out balancing. The electrolysis unit 146 also provides for plant balancing with rectifier cooling, gas cooling, and a water purification system (a purifier), etc. The electrolysis unit 146 includes a control panel and is configured to have a given length and width differing from that of the generator set 142. In some embodiments, the electrolysis unit 146 defines a footprint of about eighteen meters long (18 m) and about eleven meters wide (11 m), for example, but is not limited to either of these dimensions. The electrolysis unit 146 is arranged to receive a power input (e.g., a 2,500 kW power input). In particular, the electrolysis unit 146 is configured to receive the power input supplied by the generator set 142. The electrolysis unit 146 is configured to produce between about 1,000 kg of hydrogen per day to about 1,500 kg of hydrogen per day. In some embodiments, the electrolysis unit 146 is configured to produce about 1,080 kg of hydrogen per day (e.g., about 160 kg Hz/hr.).

The modular and movable construction of the waste energy powered hydrogen production system 136 allows for customization to specific needs on site. For example, the waste energy powered hydrogen production system 136 is configured to be tailored to the level of associated gas production by the oil well and extraction apparatus 104 over a production lifetime. Hence, the waste energy powered hydrogen production system 136 is configured to be effectively scaled onsite and redeployed to new sites to maximize asset utilization and capital efficiency. For example, during the initial installation (i.e., Stage 1) of the oil well and extraction apparatus 104 when associated gas 114 is produced at a high level (e.g., about 2,000 million cubic feet (MCF) of associated gas 114 per day), a plurality of waste energy powered hydrogen production systems (e.g., four waste energy powered hydrogen production systems 136) are configured to operate to produce an output of between about 150 kg $H_2$ to about 180 kg $H_2$ per hour over a timeframe of about 3-6 months. For example, in some embodiments, 162 kg $H_2$ per hour is produced.

In some embodiments, during a period following the initial installation (i.e., Stage 2), associated gas 114 is produced at a reduced level (e.g., about 1,000 million cubic feet (MCF) of associated gas 114 per day). Further, in some embodiments, two waste energy powered hydrogen production systems 136 are configured to be employed to produce an output of between about 60 kg $H_2$ to about 90 kg $H_2$ per hour (e.g., about 81 kg $H_2$ per hour) over a timeframe of about 6-12 months.

In some embodiments, during a period when production has levelled off (i.e., Stage 3), associated gas 114 is produced at a stable but reduced level (e.g., about 300 million cubic feet (MCF) of associated gas 114 per day), one waste energy powered hydrogen production system 136 can be employed to produce an output of between about 30 kg $H_2$ to about 50 kg $H_2$ (e.g., about 40 kg $H_2$) per hour over a timeframe of about 12-120 months.

Further, in some embodiments, the waste energy powered hydrogen production system 136 shown in FIG. 1 is configured to include a controller 200. The controller 200 is configured to communicate the generator set 142 and the electrolysis unit 146 so as to control one or more operations thereof. In some embodiments, the controller 200 provides coordinated operation of the components of the waste energy powered hydrogen production system 136. In some embodiments, the controller 200 is a central controller 200 in communication and control of multiple portions of the waste energy powered hydrogen production system 136. In some embodiments, the controller 200 is realized as a distributed controller in which each of the wastewater treatment system 138, the generator set 142, and the electrolysis unit 146 include individual controllers in communication with each other to provide the controller 200. Exemplary depictions of the function and structure of the controller 200 are shown in FIG. 11.

Figure 11:
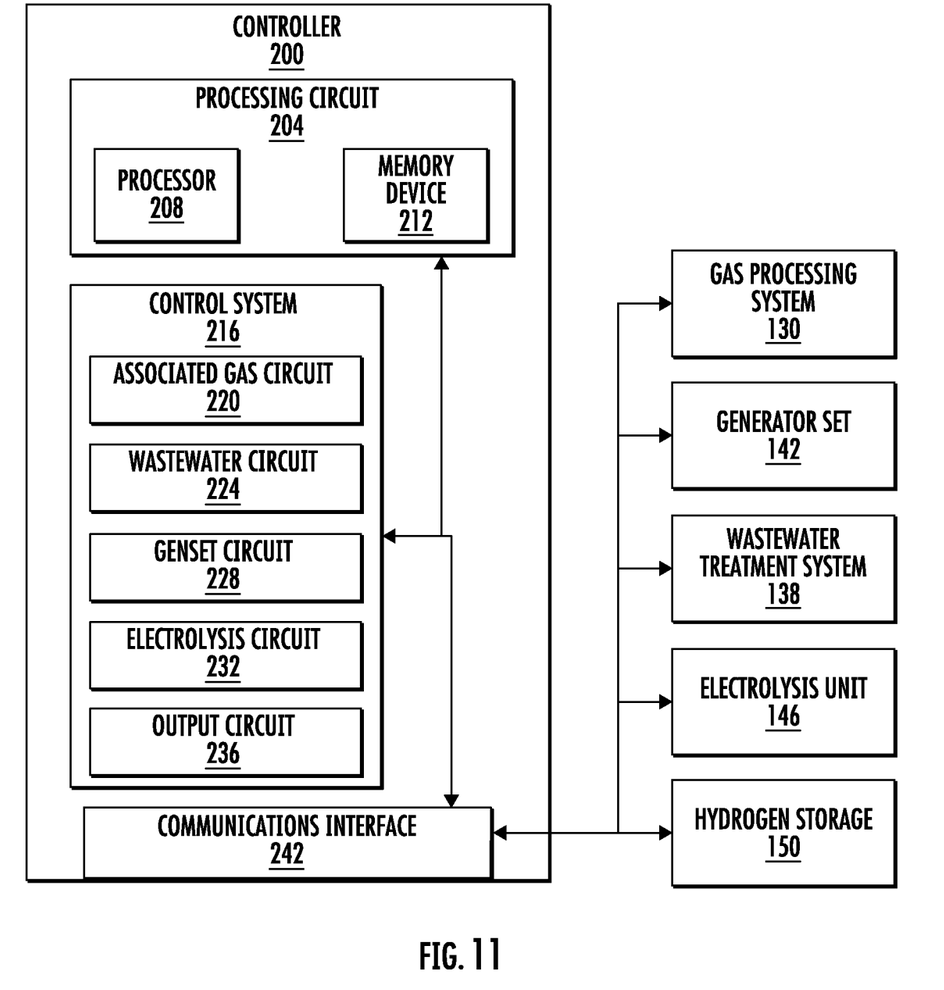
FIG. 11 is schematic diagram of a controller of the hydrogen production system of FIG. 1, according to some embodiments.

Referring now to FIG. 11, a schematic diagram of the controller 200 of the waste energy powered hydrogen production system 136 of FIG. 1 is shown according to an example embodiment. As shown in FIG. 11, the controller 200 includes a processing circuit 204 having a processor 208 and a memory device 212. The processing circuit 204 further includes a control system 216 having an associated gas circuit 220 configured to communicate with the onsite gas processing unit 130. The processing circuit 204 further includes a wastewater circuit 224 in communication with the wastewater treatment system 138. The processing circuit 204 further includes a genset circuit 228 in communication with the generator set 142. The processing circuit 204 further includes an electrolysis circuit 232 in communication with the electrolysis unit 146, and an output circuit 236 in communication with the hydrogen storage 150. The processing circuit 204 further includes a communications interface 242. Generally, the controller 200 is structured to determine a feed rate of associated gas to the onsite gas processing unit 130. The controller 200 is further structured to determine a feed rate of consumable gas from the onsite gas processing unit 130 to the generator set 142. Additionally, the controller 200 is structured to control operation of the generator set 142 and the electrolysis unit 146. The controller 200 is further structured to coordinate storage of the produced hydrogen in the storage system 150.

In one configuration, the control system 216 is embodied as machine or computer-readable media that is executable by a processor, such as processor 208. As described herein and amongst other uses, the machine-readable media facilitate performance of certain operations to enable reception and transmission of data. For example, the machine-readable media can be configured to provide an instruction (e.g., command, etc.) to, e.g., acquire data. In this regard, the machine-readable media can be configured to include programmable logic that defines the frequency of acquisition of the data (or, transmission of the data). The computer readable media can be configured to include code, which is writable in any programming language including, but not limited to, Java or the like or the "C" programming language or similar programming languages. The computer readable program code is configured to be executed on one processor or multiple remote processors. In the latter scenario, the remote processors are configured to be connected to each other through any type of network (e.g., CAN bus, etc.).

In another configuration, the control system 216 is embodied as hardware units, such as electronic control units. As such, the control system 216 is configured to be implemented as one or more circuitry components including, but not limited to, processing circuitry, network interfaces, peripheral devices, input devices, output devices, sensors, etc. In some embodiments, the control system 216 is configured to take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 216 is configured to include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on). The control system 216 is configured to include one or more memory devices for storing instructions that are executable by the processor(s) of the control system 216. In some hardware unit configurations, the control system 216 is configured to be dispersed throughout separate locations in the wastewater treatment system 138. Alternatively and as shown, the control system 216 is configured to be embodied in or within a single unit/housing, which is shown as the controller 200.

In the example shown, the controller 200 includes the processing circuit 204 having the processor 208 and the memory device 212. The processing circuit 204 is structured or configured to execute or implement the instructions, commands, and/or control processes described herein with respect to control system 216. The depicted configuration represents the control system 216 as machine or computer-readable media. However, as mentioned above, this illustration is not meant to be limiting as the present disclosure contemplates other embodiments where the control system 216, or at least one circuit of the control system 216, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 208) are configured to be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. In some embodiments, one or more processors can be shared by multiple circuits (e.g., control system 216 is configured to include or otherwise share the same processor which, in some example embodiments, can execute instructions stored, or otherwise accessed, via different areas of memory). Alternatively or additionally, the one or more processors are configured to perform or otherwise execute certain operations independent of one or more co-processors. In other example embodiments, two or more processors (e.g., processors of the generator set 142 and the electrolysis unit 136) are configured to be coupled via a bus to enable independent, parallel, pipelined, or multi-threaded instruction execution. All such variations are intended to fall within the scope of the present disclosure.

The memory device 212 (e.g., memory, memory unit, storage device) is configured to include one or more devices (e.g., RAM, ROM, Flash memory, hard disk storage) for storing data and/or computer code for completing or facilitating the various processes, layers and modules described in the present disclosure. The memory device 212 is configured to be communicably connected to the processor 208 to provide computer code or instructions to the processor 208 for executing at least some of the processes described herein. Moreover, the memory device 212 is configured to be implemented as or to include tangible, non-transient volatile memory or non-volatile memory. Accordingly, the memory device 212 is configured to include one or more database components, object code components, script components, or any other type of information structure, or any combination of any of the foregoing, for supporting the various activities and information structures described herein.

The associated gas circuit 220 is structured to receive fuel information from the gas processing unit 130 via the communication interface 242. In some embodiments, the fuel information includes a flow rate or volume of consumable fuel provided by the gas processing unit 130. In some embodiments, the associated gas circuit 220 receives production information from the oil well and extraction apparatus 104 indicative of a quantity of oil and/or a quantity of associated gas that is or are being produced.

The wastewater circuit 224 is structured to receive wastewater information from the wastewater source 134 and the wastewater treatment system 138 via the communications interface 242 and control operations of the wastewater treatment system 138.

The genset circuit 228 is structured to control operation of the generator set 142 using information from the associated gas circuit 220.

The electrolysis circuit 232 is structured to control operation of the electrolysis unit 146 using information received from the wastewater circuit 224. The electrolysis circuit 232 and the genset circuit 228 are configured to communicate to provide the electrical power required by the electrolysis unit 146 and to utilize the available associated gas 114 and wastewater 134.

The output circuit 236 is structured to monitor a hydrogen output of the electrolysis unit 146 and to control the hydrogen storage 150 to perform any one or more of maintaining storage capacity, loading of tankers, maintaining of temperatures, etc.

The controller 200 is configured to provide coordinated control of two or more of the wastewater treatment system 138, the generator set 142, the electrolysis unit 146, and the hydrogen storage 150. For example, the controller 200 is configured to provide coordinated control by allowing the waste energy powered hydrogen production system 136 to operate as a system independent from the oil extraction system 100. The integrated waste energy powered hydrogen production system 136 and controller 200 allow for implementation in varied sites and with varied capacities of associated gas 114 production.

In some embodiments, a method of producing hydrogen from gas associated with oil and well extraction is disclosed. The method according to the techniques herein may have a different order or sequence from that described, and various steps may be added or omitted. In at least one embodiment, a method of producing hydrogen includes receiving, by a generator set, gas associated with an oil extractor; producing, by the generator set, electrical power by combusting the gas; receiving, by an electrolyzer communicated with the oil extractor, wastewater, and receiving, by the electrolyzer, power from the generator set; and electrolyzing, by the electrolyzer, the wastewater to produce hydrogen therefrom. In some embodiments, the associated gas and wastewater undergo processing before the generator set and the electrolysis unit are utilized. In particular, in some embodiments, the method includes one or more pre-processing steps of each of the associated gas and the wastewater.

At least one embodiment relates to a method of producing hydrogen that includes receiving, by a generator set, gas associated with an oil extraction system; producing, by the generator set, electrical power by combusting the gas; receiving, by an electrolyzer communicated with the oil extraction system, wastewater from the oil extraction system and power from the generator set; and electrolyzing, by the electrolyzer, the wastewater to produce hydrogen.

At least one embodiment relates to a method of producing hydrogen that includes receiving, by a water treatment system, gas associated with an oil extraction system; receiving, by an electrolyzer communicated with the oil extraction system, electrical power from a utility connection; receiving, by the electrolyzer, treated wastewater from the water treatment system and power from the utility connection; and electrolyzing, by the electrolyzer, the wastewater to produce hydrogen.

In some embodiments, systems and methods described herein can significantly reduce $CO_2$ emissions. Similarly, utilizing produced water (e.g., wastewater 134) may save billions of liters of fresh water annually used for $H_2$ production from electrolysis. The systems and methods may reduce the cost of wastewater 134 disposal substantially. It is expected that thousands of tons of clean hydrogen may be produced in the Permian Basin from waste streams (e.g., associated gas and wastewater) according to exemplary implementations of the present disclosure.

Figure 12:
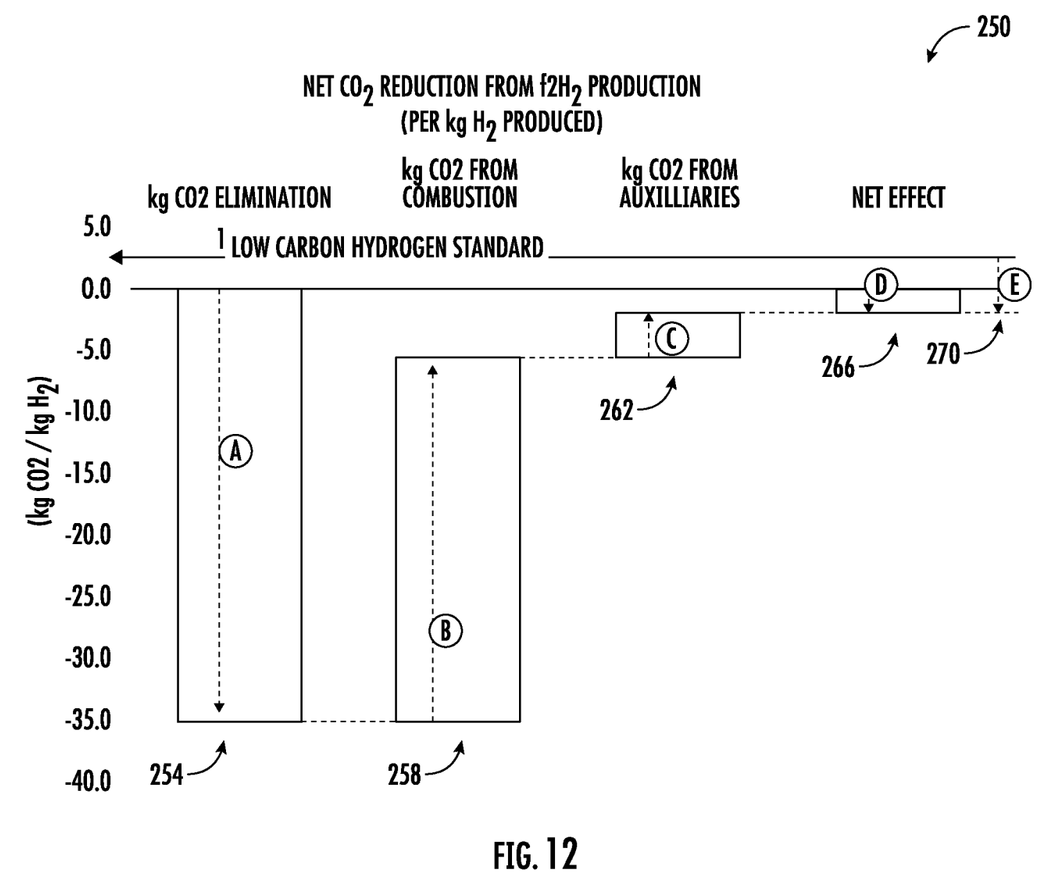
FIG. 12 is a graph of carbon dioxide reduction from clean hydrogen production using the hydrogen production systems described herein, according to some embodiments.

As shown in FIG. 12, the carbon offset provided by the oil extraction system 100 includes a reduction of carbon-dioxide by elimination of flaring and venting 254. Emissions from generator sets 142 used for power production and for powering the electrolyzer(s) 258 are considered along with emissions from auxiliary equipment for associated gas processing, water filtration, hydrogen compression, etc. 262. Therefore, when considering the carbon-dioxide production and reduction, a net effect is a reduction in GHG emissions. As discussed above, the low carbon or clean hydrogen standard is defined as equal to or less than about two kilograms of carbon dioxide equivalent produced at the site of production per kilogram of hydrogen produced. The final kilograms carbon dioxide emitted per hydrogen produced is well below the low carbon hydrogen standard.

As utilized herein, the terms "approximately," "about," "substantially", and similar terms are intended to have a broad meaning in harmony with the common and accepted usage by those of ordinary skill in the art to which the subject matter of this disclosure pertains. In general, such terms should be interpreted, if appearing before a numerical value, to encompass any values within 5% or 10% of that numerical value. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic. For example, circuit A communicably "coupled" to circuit B can signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

While various circuits with particular functionality are shown in FIG. 11, it should be understood that the controller 200 can include any number of circuits for completing the functions described herein. For example, the activities and functionalities of the control system 216 can be combined in multiple circuits or as a single circuit. Additional circuits with additional functionality can also be included. Further, the controller 200 in some embodiments is configured to control other activity beyond the scope of the present disclosure.

As mentioned above and in one configuration, the "circuits" can be implemented in machine-readable medium for execution by various types of processors, such as the processor 208 of FIG. 11. An identified circuit of executable code can, for instance, comprise one or more physical or logical blocks of computer instructions, which can, for instance, be organized as an object, procedure, or function. Nevertheless, the executables of an identified circuit need not be physically located together, but can comprise disparate instructions stored in different locations which, when joined logically together, comprise the circuit and achieve the stated purpose for the circuit. Indeed, a circuit of computer readable program code can be a single instruction, or many instructions, and can even be distributed over several different code segments, and/or among different programs.

While the term "processor" is referenced above, the term "processor" and "processing circuit" are meant to be broadly interpreted. In this regard and as mentioned above, the "processor" can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor, etc.), microprocessor, etc. In some embodiments, the one or more processors can be external to the oil extraction system 100, for example the one or more processors can be a remote processor (e.g., a cloud based processor). Alternatively or additionally, the one or more processors can be internal and/or local to the oil extraction system 100. In this regard, a given circuit or components thereof can be disposed locally (e.g., as part of a local server, a local computing system, etc.) or remotely (e.g., as part of a remote server such as a cloud based server). To that end, a "circuit" as described herein can include components that are distributed across one or more locations (e.g., in the generator set 142 and the electrolysis unit 136).

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

To the extent the figures and description illustrate a specific order of method steps, the order of such steps can differ from what is depicted and described, unless specified differently above. Also, two or more steps can be performed concurrently or with partial concurrence, unless specified differently above.

It is important to note that the construction and arrangement of the waste energy powered hydrogen production system 136 as shown in the various exemplary embodiments is illustrative only. Additionally, any element disclosed in one embodiment can be incorporated or utilized with any other embodiment disclosed herein. It should be appreciated that other elements of various embodiments can be incorporated or utilized with any of the other embodiments disclosed herein.

What is claimed is:

1. A waste powered hydrogen production system, comprising:
    a water treatment system structured to receive associated gas and wastewater from an oil extraction system;
    a utility connection structured to receive electrical power from a utility; and
    an electrolyzer structured to:
        receive treated wastewater from the water treatment system,
        receive electrical power from the utility connection, and
        produce hydrogen using the treated wastewater and the electrical power.

2. The waste powered hydrogen production system of claim 1, wherein the water treatment system includes an evaporator and a condenser.

3. The waste powered hydrogen production system of claim 1, wherein the electrolyzer includes an electrical module housed in a first mobile container and a processing module housed in a second mobile container.

4. The waste powered hydrogen production system of claim 1, further comprising a controller and switchgear in communication with both of a generator set and the electrolyzer.

5. The waste powered hydrogen production system of claim 4, wherein the controller and the switchgear are housed in a single mobile container.

6. The waste powered hydrogen production system of claim 1, wherein the utility connection is structured to receive electrical power from one or more renewable energy sources.

7. The waste powered hydrogen production system of claim 1, wherein the water treatment system is structured to receive the associated gas including flare gas.

8. A method of producing hydrogen, the method comprising:
    providing wastewater and associated gas from an oil extraction system to a water treatment system to produce treated wastewater;
    producing electrical power from a utility;
    providing, to an electrolyzer communicating with the oil extraction system, the treated wastewater from the water treatment system and the electrical power from the utility; and
    electrolyzing, by the electrolyzer using the electrical power, the wastewater to producing hydrogen.

9. The method of claim 8, wherein treating the wastewater to produce the treated wastewater includes evaporating the wastewater, by an evaporator of the water treatment system, using the associated gas.

10. The method of claim 8, further comprising producing, by the utility, electrical power by renewable energy sources.

11. The method of claim 8, wherein providing the associated gas from the oil extraction system to the water treatment system includes providing flare gas to the water treatment system.

12. The method of claim 9, wherein providing the associated gas from the oil extraction system to the water treatment system includes providing flare gas to the water treatment system.

\* \* \* \* \*